(12) United States Patent
Nascimento et al.

(10) Patent No.: US 9,399,229 B2
(45) Date of Patent: Jul. 26, 2016

(54) TRAY FOR DISPENSING A GAS AND A LIQUID, REACTOR PROVIDED WITH SUCH A TRAY, AND USE OF SAID TRAY

(75) Inventors: Pedro Nascimento, le Havre (FR); Pedro Da Silva, Vulaines-sur-Seine (FR)

(73) Assignee: TOTAL MARKETING SERVICES, Puteaux (FR)

( * ) Notice: Subject to any disclaimer, the term of this patent is extended or adjusted under 35 U.S.C. 154(b) by 272 days.

(21) Appl. No.: 14/235,953

(22) PCT Filed: Aug. 2, 2012

(86) PCT No.: PCT/FR2012/051829
§ 371 (c)(1),
(2), (4) Date: Apr. 14, 2014

(87) PCT Pub. No.: WO2013/017804
PCT Pub. Date: Feb. 7, 2013

(65) Prior Publication Data
US 2014/0284392 A1    Sep. 25, 2014

(30) Foreign Application Priority Data
Aug. 3, 2011 (FR) .................................... 11 57110

(51) Int. Cl.
*B01F 3/04* (2006.01)
*B01J 8/02* (2006.01)
(Continued)

(52) U.S. Cl.
CPC .............. *B05B 1/3405* (2013.01); *B01D 3/008* (2013.01); *B01D 3/205* (2013.01); *B01F 3/04078* (2013.01); *B01J 8/02* (2013.01); *B01J 8/0492* (2013.01); *B05B 1/14* (2013.01); *B01J 2208/0092* (2013.01); *B01J 2208/00929* (2013.01)

(58) Field of Classification Search
CPC .... B01F 3/04; B01F 3/04007; B01F 3/04078; B01J 8/02
USPC .......................... 261/76, 96, 97; 422/195, 220
See application file for complete search history.

(56) References Cited

U.S. PATENT DOCUMENTS 2,061,830 A   11/1936 Campbell
3,524,731 A    8/1970 Effron et al.
(Continued)

FOREIGN PATENT DOCUMENTS

EP    1 147 808 B1    5/2006
EP    2 075 056 A1    7/2009
EP    1 147 809 B1    6/2010

OTHER PUBLICATIONS

International Search Report for PCT/FR2012/051829 dated Nov. 7, 2012.

*Primary Examiner* — Robert A Hopkins
(74) *Attorney, Agent, or Firm* — Sughrue Mion, PLLC

(57) ABSTRACT

A distributor tray for a gas and a liquid circulating as a co-current, said tray comprising a plate perforated by orifices and supporting hollow chimneys extending perpendicularly to said plate, each orifice of the plate being surmounted by a chimney of identical cross section to said orifice, characterized in that the plate is equipped with a plurality of openings arranged on the periphery of each chimney inside a circumscribed circle, the center of which coincides with the center of the chimney, and the radius of which is less than or equal to ⅓ of the shortest distance separating two adjacent chimneys, and in that a single deflector element is arranged beneath each chimney, the openings and the deflector element associated with each of the chimneys being so arranged as to impart a rotating movement to the gas/liquid mixture under each chimney.

23 Claims, 4 Drawing Sheets

(51) Int. Cl.
*B05B 1/34* (2006.01)
*B01D 3/00* (2006.01)
*B01D 3/20* (2006.01)
*B01J 8/04* (2006.01)
*B05B 1/14* (2006.01)

(56) References Cited

U.S. PATENT DOCUMENTS

| | | |
|---|---|---|
| 4,140,625 A | 2/1979 | Jensen |
| 4,526,757 A | 7/1985 | Gupta |
| 4,820,455 A | 4/1989 | Kunesh et al. |
| 5,403,561 A | 4/1995 | Koros et al. |
| 5,799,877 A | 9/1998 | Gupta et al. |
| 5,882,610 A | 3/1999 | Darmancier et al. |
| 5,942,162 A | 8/1999 | Gamborg et al. |
| 6,093,373 A | 7/2000 | Darmancier et al. |
| 7,500,658 B2 * | 3/2009 | Boyer .................. B01D 53/185 261/96 |
| 8,211,375 B2 * | 7/2012 | Parimi .................. B01F 3/0446 261/109 |

* cited by examiner

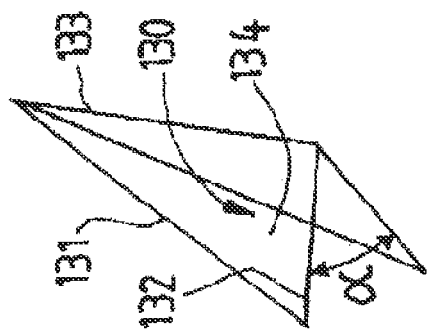
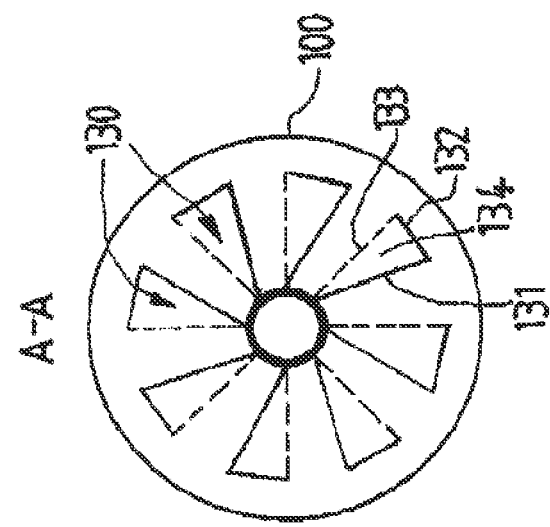
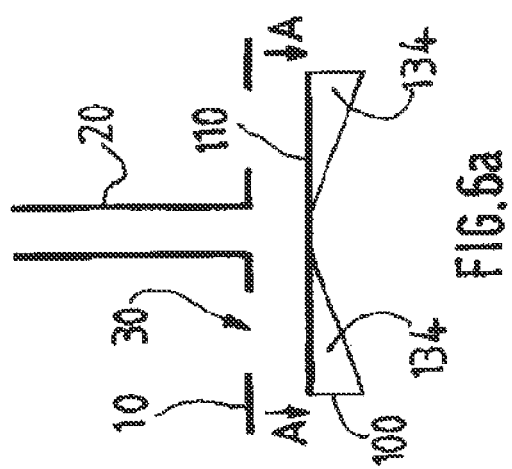
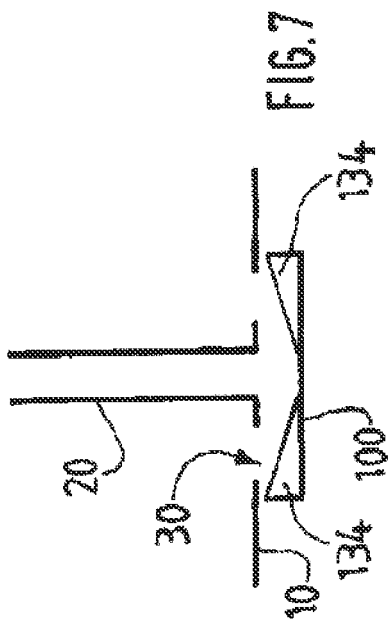

TRAY FOR DISPENSING A GAS AND A LIQUID, REACTOR PROVIDED WITH SUCH A TRAY, AND USE OF SAID TRAY

CROSS REFERENCE TO RELATED APPLICATIONS

This application is a National Stage of International Application No. PCT/FR2012/051829 filed Aug. 2, 2012, claiming priority based on French Patent Application No. 11 57110 filed Aug. 3, 2011, the contents of all of which are incorporated herein by reference in their entirety.

The invention relates to a distributor tray for a gas and a liquid, a reactor equipped with such a tray and the use of this tray.

The present invention relates to the area of reactors with (a) fixed catalytic bed(s) supplied by fluids, liquid and gaseous, capable of functioning with a descending co-current. The invention proposes a new distributor tray situated upstream of a catalytic bed and capable of improving the distribution of the supply fluids on said catalytic bed.

A large number of types of trays is available for facilitating the thermal or physical mixtures of liquid and gaseous fluids, regardless of whether these fluids are introduced as a co-current or a counter-current.

U.S. Pat. No. 5,942,162 describes the various possible technologies for co-current mixtures. Of these, the most widely used distribution trays (or distributor trays) are trays perforated by orifices that are used as a support for chimneys. In particular, each orifice of the tray leads to a chimney, of which the upper semi-open extremity permits the passage of the reactant gas. For the passage of the liquid towards the interior of the chimney, a number of technologies have been developed as described in U.S. Pat. No. 5,882,610, U.S. Pat. No. 6,093,373, EP 1 147 808 and EP 1 147 809. Openings or holes, situated in the lower part of each chimney, permit the mixture of the liquid and the gas within the chimneys to be assured, in the lower part of the latter, before passing over the catalytic bed, which bed is often preceded by at least one layer of inert balls intended to divide the flow of the charge and to redistribute it in order to avoid creating preferential circuits, sources of hot spots and coking in the catalytic bed. In applications such as these, the volume ratios of the gas to the liquid are often greater than 3:1 and are habitually below 400:1, the most common cases being when this ratio varies in the range from 10 to 200.

Configurations exist, however, for which the quantity of gas entering via the chimneys is very low in relation to the quantity of liquid, for example when the volume ratio of the gas to the liquid is less than or equal to 3. A high quantity of liquid is accompanied by a very steep increase in the number of more generously dimensioned chimneys, although the mixing between the liquid and the gas is still inadequate and this method of mixing is inefficient as a result. In extreme cases, when the cross section of the holes in the lower part of the chimney is greater than the cross section of the chimney, not all the liquid is able to pass through the chimneys and the level of the liquid rises on the tray, said level being capable of exceeding the height of the chimneys, which disrupts the steady flow of the gas. Until now, the only solution to this type of problem involved separating the passage of the gas into dedicated chimneys and the passage of the liquid via holes distributed at regular intervals over the entire surface of the tray. The passage of the gas and the liquid are separated under these conditions, however, there is no gas/liquid mixing and no dispersion of the liquid is assured by the gas.

Document U.S. Pat. No. 5,799,877 describes a device for the distribution of a fluid on a bed of particles, said device being formed from a tray perforated by orifices used to provide support for chimneys. The purpose of this document is to achieve the uniform distribution of a mixture of two liquid/gaseous phases across the bed of particles associated with a low reduction in pressure, the two phases circulating as a descending co-current. In order to achieve this purpose, the tray includes conduits for the passage of the gas, each conduit being surrounded by a conduit for the liquid, such that the liquid exits via an annular space arranged between the two conduits. The central gaseous flow is thus surrounded by a ring of liquid at the time when it exits beneath the tray and, given a small fall in pressure across the gas conduit, the gas expands at the outlet and, as it makes contact once again with the liquid surrounding it, forms a spray of liquid and gas beneath the tray. In this document, the conduits for the gas and the liquid are concentric tubes. The distribution of liquid may be continuous by providing slots on the wall of the tubes to permit the passage of the liquid. The distribution of liquid may also be pulsed by closing the top of the tubes for the passage of the liquid, at a predetermined height, and by providing an entrance for the liquid close to the top of these tubes; when the liquid reaches this entrance, it is discharged beneath the tray. The tubes for the passage of liquid then function in the manner of siphons (this principle is also described in document U.S. Pat. No. 4,526,757). Finally, the distribution of the liquid may be mixed, a continuous flow of liquid being obtained through slots in the wall of the tubes, the top of these tubes being closed in order to form siphons for intermittently ensuring a pulsed flow of liquid. Deflectors positioned under the tray, beneath the outlets for gas and liquid, are able to assist with the formation of a spray of gas and liquid, and in particular with the formation of a conical spray of gas and liquid, of the kind described in document U.S. Pat. No. 5,403,561.

Document U.S. Pat. No. 5,799,877 does not offer guidance on how to improve the mixing of gas and liquid. Furthermore, the requester has noted that the presence of siphons for the introduction of the liquid does not permit good mixing of the gas and the liquid to be obtained when the latter are difficult to mix, and in particular when the gas/liquid volume ratio is less than or equal to 3.

When the gas and the liquid are difficult to mix, the course of the reaction within the catalytic bed downstream of the distributor tray does not take place in an optimal fashion.

The aim of the invention is to overcome these disadvantages by proposing a distributor tray allowing a homogeneous distribution of gas and liquid. Such a distributor tray is intended more particularly for a reactor comprising at least one catalytic bed, although it could be adapted to multiple-bed reactors.

For this purpose, a first object of the invention concerns a distributor tray for a gas and a liquid circulating as a descending co-current, said tray comprising a plate perforated by orifices supporting hollow chimneys extending perpendicularly to said plate, each orifice of the plate being surmounted by a chimney of identical cross section to said orifice, characterized in that the tray is equipped with a plurality of openings arranged on the periphery of each chimney inside a circumscribed circle, the centre of which coincides with the centre of the chimney, and the radius of which is less than or equal to ⅓ of the shortest distance separating two adjacent chimneys, and in that a single deflector element is arranged beneath each chimney, the openings and the deflector element associated with each of the chimneys being so arranged as to impart a rotating movement to the gas/liquid mixture under each chimney.

By <<centre of the chimney>>, it is meant herein above the center of the chimney within the plane of the plate. That is, the circumscribed circle is centred around the corresponding chimney.

These openings thus pass through the tray from one side to the other in order to permit the passage of the liquid through the tray and are situated around each chimney. In particular, these openings are situated inside an area of the tray that is delimited on the one hand by the chimney and on the other hand by a circumscribed circle, the centre of which coincides with the centre of the chimney, and the radius of which is less than or equal to ⅓ of the shortest distance separating two adjacent chimneys. This distance between chimneys is measured between the centres (or axes) of the chimneys concerned. The openings are thus located on the periphery of each chimney inside said circumscribed circle.

With the gas passing through the tray via the chimneys and the liquid passing through the distributor tray via the openings around each chimney, the mixing of the gas and the liquid no longer takes place in the lower part of each chimney, as was previously the case for distributor trays of the prior art, but rather beneath each chimney of the distributor tray. Furthermore, the openings made in the plate forming the tray are not distributed over the entire surface of the tray, but they are localized solely on the periphery of the chimneys.

The rotating movement may be obtained by particular forms of the openings and/or the single associated deflector permitting the liquid and/or gaseous flow to be guided beneath the tray for the purpose of their mixing. The particular forms of the associated openings and/or the deflector are described in the rest of the present description.

Whatever its form, the function of each deflector element is to guide the gas descending through the chimney towards a liquid distributed on the periphery of the chimney through said openings.

Such deflector elements permit the mixing of the gas and the liquid to be optimized. In particular, the one or more deflector elements define a mixing zone beneath each chimney, in which zone the gas arriving via the chimney and the liquid arriving via the openings are mixed. Although there is no optimal distance between the tray and said deflector element, this distance should be selected preferentially from 1 mm to 20 mm, and preferably from 2 mm to 10 mm.

The single deflector element positioned beneath each chimney advantageously exhibits a surface projected onto the plate, of which the contour is such that it covers, at least in part, said openings that are arranged on the periphery of the chimney with which it is associated. The surface of the deflector element projected onto the plate is larger than the surface of the chimney, and may possibly be substantially equal to or greater than the surface of the circumscribed circle enclosing these openings on the plate: the deflector element guides the gas arriving from the chimney towards the liquid in order to facilitate the mixing of the gas arriving from the chimney and the liquid arriving from the openings.

When the openings passing through the plate of the distributor tray are positioned so as to impart a rotating movement to the liquid passing through them, each deflector element associated with these openings may be plane and/or convex, having a convexity that is directed preferentially towards the chimney. The convex form permits the speed of the gas beneath the chimney to be adjusted, while still permitting sufficient space to be available on the periphery for the passage of the liquid. The deflector element in this case is preferably a solid surface, without any orifices.

For example, if each deflector element comprises a plane wall arranged beneath the chimney and parallel to the plate, said plane wall may be possibly bounded by an inclined wall, of which the angle of inclination does not play an essential role.

The openings passing through the plate of the distributor tray may be distributed advantageously at regular intervals on the periphery of each chimney inside said circumscribed circle, which permits the improvement of the distribution of the liquid passing through the distributor tray around each chimney and thus the improvement of the gas/liquid mixture beneath each chimney.

These openings will preferably be identical. They may be of circular, triangular, square, rectangular or any other polygonal form. They are dimensioned, for example, to allow the passage of all the liquid without the level of the liquid on the tray exceeding the height of the chimney, in other words the top of the chimney.

These openings will preferably not comprise any part projecting on the surface of the plate supporting the chimneys. In particular, these openings may be not surmounted by tubes or chimneys, in order to facilitate the passage of the liquid.

The openings made through the plate of the distributor tray according to the invention may be obtained by drilling, punching and/or stamping and may include remains of plate that has been punched and stamped to form a deflecting wall for the liquid, beneath the plate.

According to this first embodiment of the invention, the deflecting walls of these openings that are produced through the plate of the distributor tray permit a rotating movement to be imparted to the liquid passing through said openings. This, in association with the single deflector beneath each chimney, permits the dispersion of the mixture formed beneath the distributor tray to be improved and, more particularly, the mixing of the gas and the liquid to be improved, especially when the volume of gas is low.

Each opening made through the plate of the distributor tray may comprise a deflection wall, either plane or curved, produced by punching, drilling and/or stamping, in order to guide the fluid in a direction that is inclined at an angle $\alpha$ in relation to the plate and substantially tangent to a circle of which the chimney is the centre.

For example, the deflecting wall of each opening provided across the plate of the distributor tray is plane or curved, and is inclined at an angle $\alpha$ in relation to the plate.

Each opening arranged on the periphery of a chimney preferably extends along a radius of a circle of which this chimney is the centre, and all the openings arranged on the periphery of one and the same chimney are oriented in one and the same direction in relation to their respective radius.

Such an arrangement induces a circulation of the flows of liquid emerging from each opening according to a globally circular, and in particular substantially helicoidal, movement beneath the distribution tray, thereby permitting the peripheral distribution of the liquid/gas mixture formed beneath each chimney and an improvement in the gas/liquid mixture.

For example, these deflection walls associated with the openings may be formed by cutting two sides of a triangle and by folding the triangular part cut in this way along the third side of the triangle, for example along a radius of the circumscribed circle, in a direction opposite to the chimney, the plane of said folded triangular part forming an angle $\alpha$ in relation to the plane of the plate.

Whatever the embodiment of these openings, this angle α is at least 30°, for example, and is preferably between 30° and 60°.

In a second embodiment of the invention, it is not the openings in the plate which permit a rotating movement to be imparted to the gas/liquid mixture beneath a chimney, but rather the single deflector element positioned beneath this chimney. The latter also permits the improvement of the dispersion of the mixture formed beneath the distributor tray and, more particularly, the improvement of the mixing of the gas and the liquid, especially when the volume of gas is low.

In this case, the openings made through the distribution tray are generally devoid of any wall projecting from one side or the other of the plate of the distributor tray, and the single deflector element associated with each chimney exhibits a form adapted to impart said rotating movement to the mixture of gas and liquid, said rotating movement being capable of being imparted between the plate and the deflector as a counter-current to the descending flows of liquid and gas and/or as a co-current of these. Each deflector element associated with a chimney may comprise a plate that is traversed by a plurality of openings so arranged as to impart a rotating movement to the gas/liquid mixture passing through them.

For example, each opening that is provided through the plate of the deflector element may be so arranged as to guide the gas/liquid mixture in a direction that is inclined at an angle α in relation to the plate of the distributor tray, from one side or the other side of the latter. This direction is for example substantially tangent to a circle of which the chimney, placed below the deflector element, is the centre.

The openings of each deflector element may thus exhibit the same characteristics as the openings in the distributor tray of the first embodiment.

According to one variant embodiment, each opening in the plate of a deflector element may comprise, integral with at least a part of its edge, a deflecting wall resulting from the method of punching, drilling or stamping of the openings of the deflector: said wall may be of plane or curved form, inclined at an angle α in relation to the plate of the distributor tray.

In particular, each opening in the deflector element may extend along a radius of a circumscribed circle of which this chimney is the centre, and all the openings in the deflector element may be oriented in one and the same direction in relation to their respective radius.

For example, these openings in each deflector element can be formed by cutting two sides of a triangle and by folding the triangular part cut in this way along the third side of the triangle in a direction opposite the chimney, the plane of said folded triangular part forming an angle α in relation to the plane of the plate.

Whatever the embodiment of the openings of each deflector element, this angle α is at least 30°, for example, and is preferably between 30° and 60°.

Whatever the form of the openings, each deflector element may comprise one or more of the following characteristics:
- its openings may be distributed at regular intervals on the periphery of the axis of the deflector, inside a circumscribed circle having a radius less than, equal to or greater than that which surrounds the openings made in the distributor tray,
- its openings may be of circular, triangular, square, rectangular or any other polygonal form,
- its openings may be distributed on the periphery of said deflector element, around a circle having a surface area identical to or greater than that of the section of the chimney that is arranged below and, where appropriate, on the interior of a circle having the same dimensions as the circumscribed circle surrounding the openings passing through the plate of the distribution tray,
- its openings may extend as far as an outer edge of the plate forming said deflector element, thereby defining vanes on said outer edge of the deflector element.

According to another variant embodiment, each deflector element may be formed from a plurality of vanes inclined at an identical angle α in relation to the plate of the distributor tray, these vanes extending radially in relation to the axis of the chimney associated with the deflector element in a plane that is substantially parallel or parallel to the plate of the distributor tray.

This angle α is at least 30°, for example, and is preferably between 30° and 60°.

In this embodiment, the vanes of one and the same deflector element may be joined together on the side of their extremity close to the axis of the chimney.

Whatever the embodiment of the deflector element (with openings or vanes), the surface of this deflector element projected on the distributor plate may be inscribed within a circle, of which the centre is situated on the axis of the chimney beneath which said deflector element is positioned, and of which the diameter is always greater than the diameter of the chimney and is preferably equal to or greater than the diameter of the circumscribed circle surrounding the openings passing through the distributor tray that are arranged on the periphery of said chimney.

Such a deflector element is preferably fixed.

Whatever the embodiment of the deflector element, the latter may exhibit one or a plurality of the following characteristics:
- each deflector element may be configured in such a way that its surface projected onto the plate of the distributor tray covers the totality of the peripheral openings surrounding the chimney, beneath which it is positioned,
- each deflector element may be positioned at a distance from the plate of the distributor tray in the range between ⅛ d and 2 d, d being the diameter of the chimney beneath which the deflector element is positioned,
- each deflector element may extend in a plane parallel to the plate of the distributor tray,
- the openings or the vanes of a deflector element may be positioned beneath the openings passing through the plate of the distributor tray,
- the walls associated with the openings or the vanes are oriented so as to redirect the mixture in a rotating movement, either as a counter-current between the plate and the deflector or as a co-current beneath the deflector, relatively to the circulation of gas and liquid passing through the distributor tray.

These different characteristics, taken in isolation or in combination, can permit the liquid/gas mixture to be improved.

According to one variant, the distributor plate according to the invention comprises around each chimney a wall forming a barrier that is integral with the plate and extends perpendicular to it, said wall forming a barrier surrounding said openings, which are made through the plate of the distributor tray, on the periphery of the chimney and comprising a plurality of holes distributed over the surface for the passage of the liquid. A wall of this kind forming a barrier makes it possible to maintain a level of liquid on the distributor tray and thus to guarantee the supply of liquid to each set of openings surrounding a chimney, even when the level of liquid on the distributor tray is not perfectly horizontal over the entire surface.

This wall forming a barrier is, for example, a cylindrical wall arranged concentrically in relation to the surrounded chimney.

The holes in said wall forming a barrier are of all shapes, although preferably circular, in order to assure the passage of at least 20% in volume of the liquid and at most 50% in volume of the liquid, the remainder passing above said wall forming a barrier by overflowing.

The walls of the chimneys on the distributor tray can be solid and devoid of orifices.

As a variant embodiment, each chimney may be provided in its lower part with orifices for the passage of the liquid to the interior of the chimney, these orifices being dimensioned, for example, so that the cross section for the passage is smaller than the cross section of the chimney, these orifices not being able to permit the passage of more than 50% in volume of the total quantity of liquid. Preferably, these orifices will permit the passage of less than 20% in volume of the total quantity of liquid.

A further object of the invention is a reactor for the treatment of a liquid and a gas circulating as a descending co-current, said reactor comprising at least one distributor tray according to the invention, each distributor tray being arranged upstream of a catalytic bed in relation to the direction of flow of the gas/liquid to be treated.

The invention also relates to the use of a distributor tray according to the invention to distribute in a homogeneous manner a liquid and a gas circulating as a descending co-current in a reactor, in which the gas passes through the tray via the chimneys of the latter, and the liquid passes through the tray via the openings in the latter and, where appropriate, via any orifices in each chimney.

In particular, said tray is especially adapted to reactors, for which gas and a liquid are introduced in a gas/liquid volume ratio of less than or equal to 3, preferably in the range from 0.1 to 2, and more preferably in the range from 0.4 to 1. In such applications, the gas preferably contains hydrogen.

Said tray is used in reactors for the hydrogenation of a hydrocarbon charge, for example for the selective or total hydrogenation of olefinic and/or aromatic cuts, in hydrotreatment (hydrodesulphurization, hydrodenitrification, hydrodemetallization), in hydrocracking, in hydrodewaxing and/or in the isomerization of paraffins.

The invention is now described below with reference to the accompanying drawings, which are not restrictive, in which.

Figure 5:
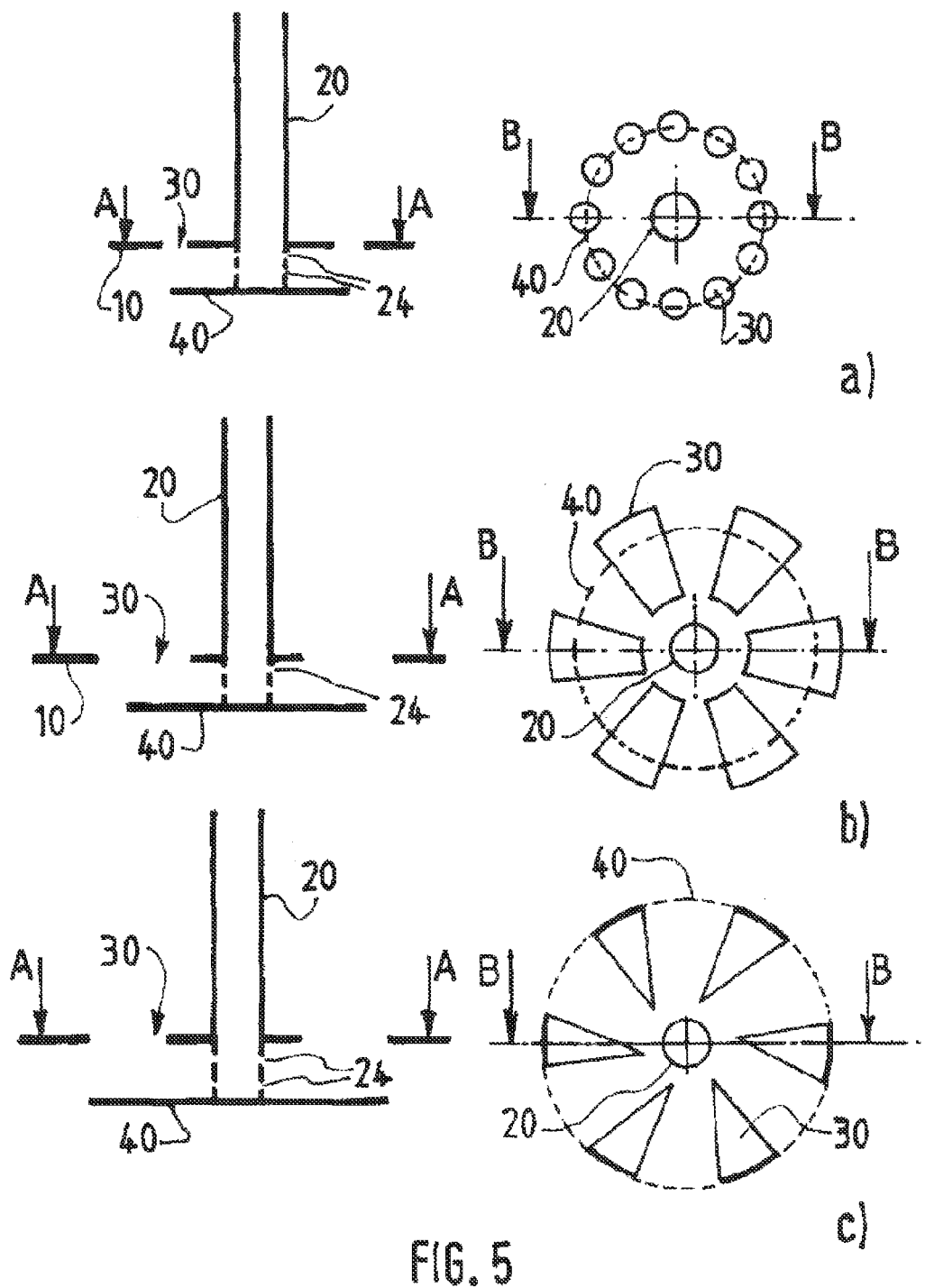

FIG. 5 gives a representation according to two cross sections, (A-A) and (B-B), of the various possible arrangements of the chimney, openings and deflectors of a tray according to the invention, the diameter of the deflector having a diameter greater than that of the chimney but capable of being equal to the largest diameter of the circumscribed circle enclosing said peripheral openings around the chimney.

FIG. 6a depicts a schematic view from the side of a distributor tray according to one embodiment of the invention for a mixture of gas and liquid as a counter-current, FIG. 6b being a depiction of a deflector according to the section (A-A) in FIG. 6a, and FIG. 6c being a detail of FIG. 6b showing the angle of folding α between the plane of said folded triangular part and the plane of the plate of the tray forming the deflector;

FIG. 7 depicts a schematic view from the side of a distributor tray according to one embodiment of the invention for a mixture of gas and liquid as a co-current.

By <<direction substantially tangent to a circle>>, it is meant herein a direction tangent to said circle or forming an angle of at most ±20°, even at most ±10° or at most ±5° relatively to the tangent of said circle.

Figure 1:
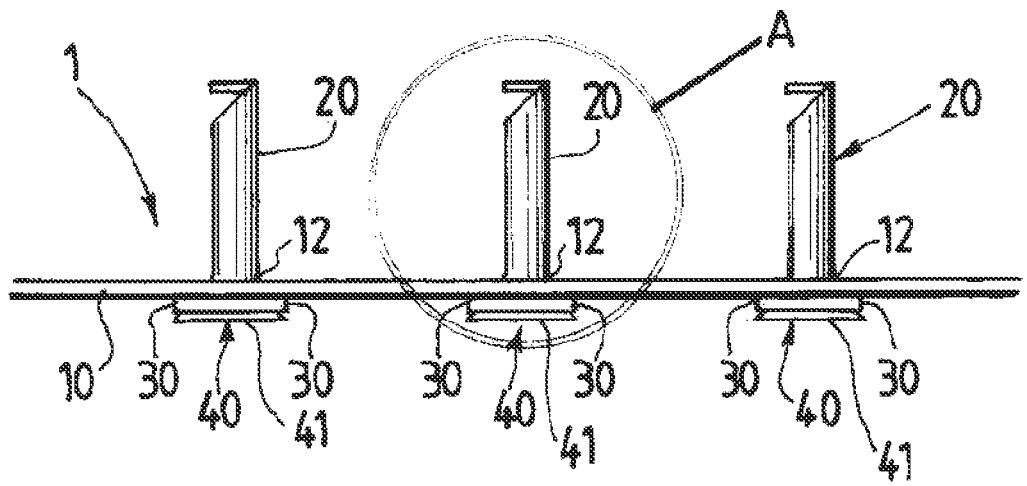
FIG. 1 depicts a side view of a distributor tray according to one embodiment of the invention.

FIG. 1 depicts a distributor tray 1 for a gas and a liquid circulating as a descending co-current.

The tray 1 comprises a plate 10 that is perforated by orifices 12 supporting hollow chimneys 20 extending perpendicularly to said plate 10. The plate 10 can comprise between 10 and 100, and by preference between 40 and 100 orifices 12 per square meter.

Each orifice 12 of the plate 10 is surmounted by a chimney 20 having the same cross section as said orifice 12. The chimneys 20 are situated entirely above the plate 10. It would not constitute a departure from the scope of the invention if these chimneys were to extend below said plate. Generally speaking, the chimneys are cylindrical, open or partially closed at their upper extremity.

According to the invention, the plate 10 is equipped with a plurality of openings 30 arranged on the periphery of each chimney 20.

Figure 2:
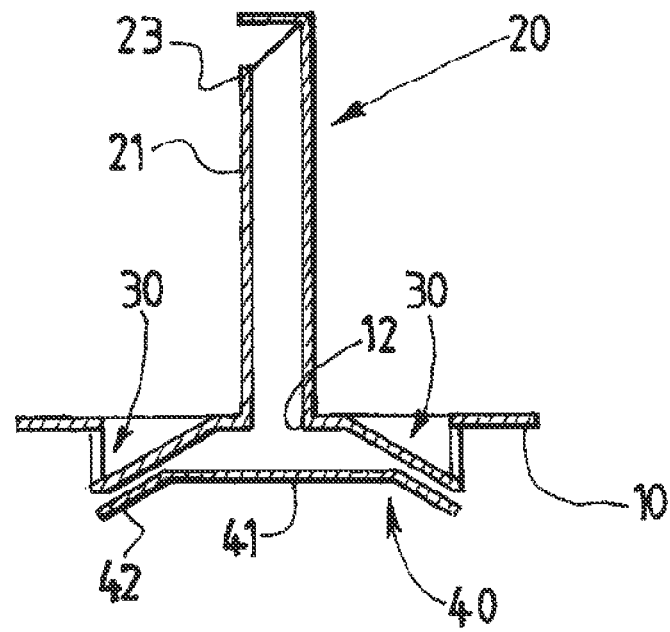
FIG. 2 depicts a sectional view of the detail A depicted in FIG. 1, showing a chimney of this tray in cross section.

In the example in FIG. 2, each chimney 20 is formed by a cylindrical wall 21 that is devoid of orifices. The upper edge 23 of each chimney is generally semi-open in order to permit only the gas to enter the chimney.

Figure 3A:
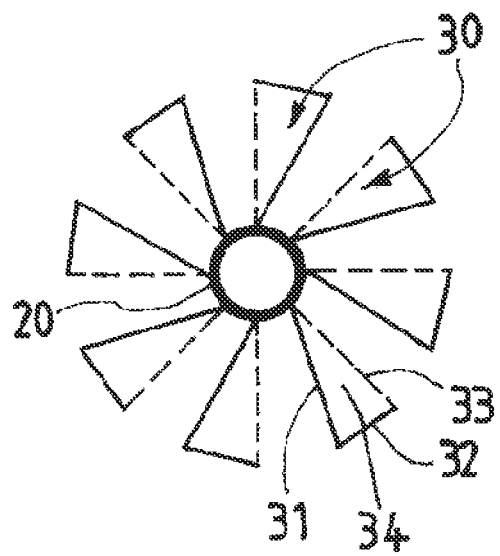
FIG. 3a depicts a view from above of the detail A depicted in FIG. 1, showing a view from above of the chimney and the openings on the periphery of the chimney (3a)
Figure 3B:
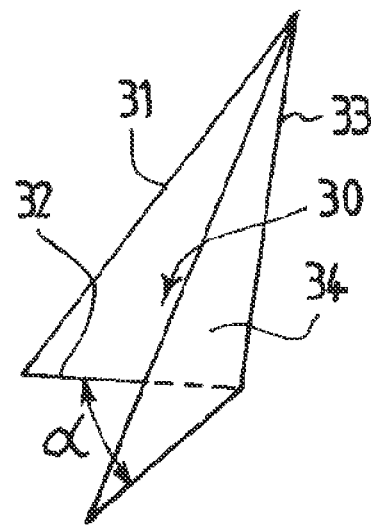
FIG. 3b is a detail of FIG. 3a showing the angle of folding α between the plane of said folded triangular part and the plane of the tray.

The openings 30 are so arranged as to impart a rotating movement to the liquid passing through them, as depicted in FIGS. 3a, 3b.

Each opening 30, as illustrated in FIG. 3b, is thus arranged to guide the liquid in a direction inclined at an angle α in relation to the plate 10 and substantially tangent to a circle of which the chimney 20 is the centre. Each opening 30 arranged on the periphery of a chimney also extends along a radius of a circle of which this chimney is the centre, and all the openings 30 arranged on the periphery of one and the same chimney are oriented in one and the same direction in relation to their respective radius.

In the example depicted in FIGS. 2 and 3a, 3b, such openings 30 are formed by cutting two sides 31, 32 of a triangle (FIG. 3a) and by folding the triangular part 34 cut in this way along the third side 33 of the triangle beneath the plate 10 in relation to the chimney, said folded part forming an angle α in relation the plane of the plate 10 (FIG. 3b).

The sides 31 and 33 form the longest sides of the triangular part 34.

The third side 33, along which the cut triangular part 34 is folded, may extend radially from the chimney 20. As a variant, the triangular part 34 may be isosceles, the sides 31 and 33 being identical and the height of the triangular part extending radially from the chimney 20.

All the triangular parts 34 that are cut for the formation of the openings 30 are situated on one and the same side of the third side 33 of the triangle, as can be seen in FIG. 3a. In other words, all of these triangular parts 34 are cut in such a way that the liquid which they allow to pass through is guided in one and the same direction in relation to a radius of a circle having the chimney 20 as its centre.

The angle of inclination α of the triangular part 34 in relation to the plate 10 is at least 30° and is preferably between 30° and 60°.

These openings 30 may be obtained by drilling/punching and stamping.

All of the depicted openings 30 are identical and are distributed at regular intervals on the periphery of each chimney 20, as can be seen in FIG. 3a, favoring the homogeneous distribution of the liquid/gas mixture.

The distributor tray 1 depicted in FIG. 1 additionally comprises, beneath each orifice 12 surmounted by a chimney 20, at least one deflector element so arranged as to guide a gas as it descends via the chimney towards a liquid distributed on the periphery of the chimney via the openings 30.

In the depicted example, a single deflector element 40 is arranged beneath each chimney 20. The surface of this deflector element 40, when projected onto the plate 10, exhibits a contour surrounding said openings 30 that are arranged on the periphery of the chimney with which it is associated.

This contour may be of circular or polygonal form, for example octagonal.

In FIG. 2, the deflector element 40 comprises a solid plane wall 41 arranged beneath the chimney 20 parallel to the plate 10, said plane wall 41 being bounded by an inclined wall 42. The deflector element 40 thus exhibits a convex form, of which the convexity is directed towards the chimney 20.

It would not, of course, constitute a departure from the scope of the invention if this convex deflector were to be replaced by a plane deflector responding to the same characteristics, that is to say exhibiting a diameter close to that of the circumscribed circle surrounding the openings 30 around the chimney 20.

The deflector element 40 is secured to the plate 10 from the other side and beneath the chimney 20, by any adequate means, and in particular by means which do not disrupt the mixing of the gas and the liquid that are mixed between the deflector element 40 and the plate 10. This may be achieved with rods or screws (not illustrated here), for example, or possibly by welding the tips of the triangular parts 34.

Figure 4:
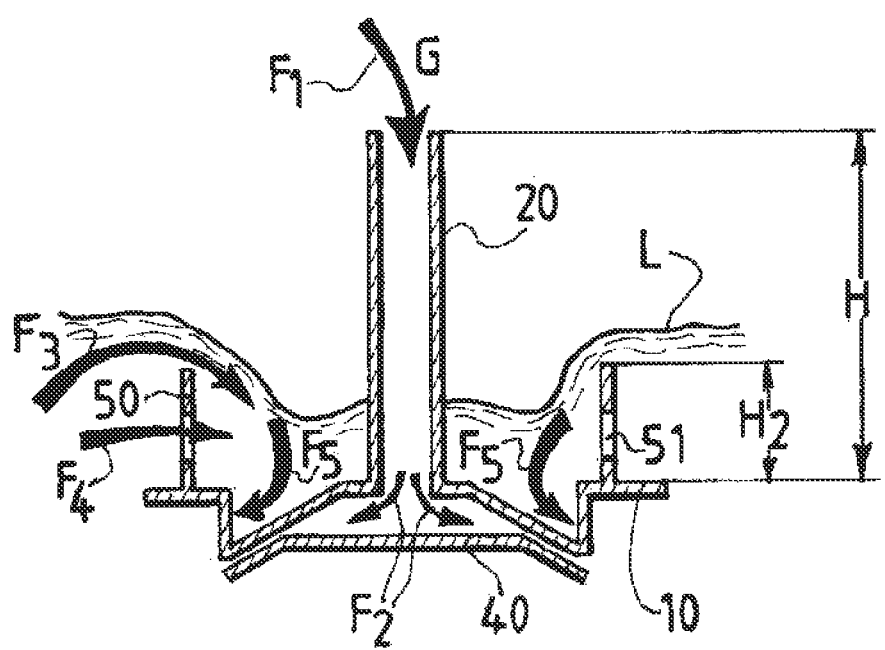
FIG. 4 is identical to FIG. 2, but includes a barrier which surrounds the openings and depicts the circulations of gas and liquid across the depicted distribution tray.

The circulation of the gas and the liquid through the distributor tray according to the invention is symbolized by the arrows in FIG. 4. In the embodiment depicted in this figure, the distributor tray 1 also comprises around each chimney a wall forming a barrier 50 that is integral with the plate 10 and extends perpendicular to it.

This wall forming a barrier 50 surrounds the openings 30 of the chimney 20. In the depicted example, this wall forming a barrier 50 is a cylinder that is concentric with the chimney 20.

The wall forming a barrier 50 comprises a plurality of holes 51 distributed on the surface for the passage of the liquid.

The height H2 of the wall forming a barrier 50 will be at least equal to half of the height H of the chimney that it surrounds. The diameter of the wall forming a barrier 50 will be at least equal to three or four times the diameter of the chimney 20 that it surrounds.

The gas G enters (arrow F1) via the upper extremity of the chimney 20 and emerges, beneath the plate 10, facing the deflector element 40, which causes it to deviate towards its periphery (arrows F2).

In the presence of a wall forming a barrier 50, the liquid L passes above this wall forming a barrier 50 (arrow 3) and also through its orifices 51 (arrow 4) before passing through the distributor tray via the openings 30 (arrows F5). The liquid L is mixed with the gas G in the zone defined by the plate 10 and the deflector element 40.

The form of the openings 30 imparts a rotating movement to the liquid L, which is generally centrifugal, and which favours the distribution of the resulting mixture.

Depicted in FIG. 5 are various arrangements (a), (b), (c) for the chimneys/openings in the plate 10 and deflectors, which it would also be possible to produce in accordance with the present invention. The section (A-A) corresponds to a view from above of the plate 10 representing the form of the punched-out holes in the openings 30 around the chimney 20. Dotted lines are used to represent the contour of the deflector 40 associated with each chimney, the latter not always having a diameter that is identical to the circumscribed circle covering the openings 30, but possibly being slightly smaller. The section (B-B) is a cross section of the axis of the chimney 20 exhibiting different positions of the chimney 20 and of the deflector 40, the lower extremity of said chimney 20 being able to delimit a slot 24 for the injection of gas, the effect of which is to accelerate its injection beneath the liquid intake openings 30.

The rotating movement of the liquid passing through the distribution tray via the openings 30 may be obtained by inclining, or by configuring in an appropriate manner, the deflection wall 34 as it emerges from the punching for the opening 30, in a manner similar to that described with reference to FIGS. 3a and 3b, including for openings 30 of circular or trapezoidal or some other form.

In particular, when the opening 30 is circular, the partially punched deflection wall is lowered and may exhibit a form of trough for guiding the liquid in the desired direction in order to impart a rotating movement.

As a variant, a similar result may be obtained by joining a wall to the edge of each opening, said wall being positioned and oriented like the deflection wall 34 described above.

As a variant, or in combination, the rotating movement of the liquid may be obtained by the use of a deflector element 100 of adapted form, as depicted in FIGS. 6a, 6b, 6c. In particular, this deflector element 100 may be formed from a plate 110 that is pierced by openings 130, these openings 130 being arranged for the purpose of imparting a rotating movement to the fluid passing through them. In particular, the fluid in this case is the mixture of gas and liquid emerging from the distributor tray.

The plate 110 of the deflector element 100 extends parallel to the plate 10 of the distributor tray, and beneath it. The plate 110 is positioned beneath the plate 10 of the distributor tray, at a distance from the latter in the range between ⅛ d and 2 d, d being the diameter of the chimney beneath which the deflector element is positioned.

The deflector element 100 is such that its surface, when projected onto the plate 10 of the distributor tray, covers the totality of the peripheral openings 30 surrounding the chimney 20 beneath which it is positioned. Thus, the liquid passing through the plate 10 via the openings 30 is placed in rotating movement when it comes into contact with the deflector element 100. The deflector element 100 is centred on the chimney, the openings 130 of the deflector element being situated below the openings 30 of the plate 10.

Each opening 130 of the deflector element 100 may exhibit a form similar to the form of the openings 30 described with reference to FIGS. 3a, 3b. It will be noted that these openings 130 could extend as far as the external extremity of the deflector element and could thus define vanes at the external periphery of the deflector element.

With reference to FIGS. 6a, 6b, 6c, each opening 130, as illustrated in FIG. 6b, is thus so arranged as to guide the fluid in a direction that is inclined at an angle α in relation to the plate 110. Each opening 130 extends in addition along a radius of a circle having a centre which coincides with the centre of the deflector element (aligned vertically with the centre of a chimney), and all the openings 130 of one and the same deflector element 100 are oriented in one and the same direction in relation to their respective radius.

In the example depicted in FIGS. 6a,b,c, such openings 130 are formed by cutting two sides 131, 132 of a triangle (FIG. 6c) and by folding the triangular part 134 cut in this way along the third side 133 of the triangle beneath the plate 110, said folded part 134, or deflection wall, forming an angle α in relation to the plane of the plate 110 (FIG. 6c).

The sides 131 and 133 form the largest sides of the triangular part 134 or deflection wall.

The third side 133, along which the cut triangular part 134 is folded, may extend radially from the centre of the deflector 100. As a variant, the triangular part or the deflection wall 134 may be isosceles, the sides 131 and 133 being identical and the height of the triangular part extending radially from the centre of the deflector.

All the triangular parts 134 that are cut for the formation of the openings 130 are situated on one and the same side of the third side 133 of the triangle, as can be seen in FIG. 6b. In other words, all of these triangular parts 134 are cut in such a way that the fluid which they allow to pass through is guided in one and the same direction in relation to a radius of a circle having a centre which coincides with the centre of the deflection element 100 and the axis of the chimney beneath which the deflector element is positioned.

The angle of inclination α of the triangular part or the deflection wall 134 in relation to the plate 110, and thus the plate 10 of the tray, is at least 30° and is preferably between 30° and 60°.

These openings 130 may be obtained by drilling/punching and stamping.

All of the depicted openings 130 are identical and are distributed at regular intervals on the periphery of each deflector, as can be seen in FIG. 6b, favoring the homogeneous distribution of the liquid/gas mixture.

The variant depicted in FIG. 7 differs from that depicted in FIGS. 6a,b,c only by the fact that the folded triangular part 134 extends above, instead of being situated beneath, the plane of the deflector 100, between the plate 110 and the plate 10.

The variant depicted in FIGS. 6a,b,c is particularly adapted for directing the liquid having passed through the distributor tray in direction to the distribution tray, in other words, at counter current of the gas and liquid circulation.

The variant depicted in FIG. 7 is particularly adapted for directing the liquid having passed through the distributor tray in a direction opposite to the distribution tray, in other words, at co current of the gas and liquid circulation.

A deflector element of the same type as that described with reference to FIGS. 6a,b,c and 7 can be used as a replacement for the deflector 24 in FIGS. 5a,b,c.

The invention claimed is:

1. A distributor tray for a gas and a liquid circulating as a co-current, said tray comprising a plate perforated by orifices and supporting hollow chimneys extending perpendicularly to said plate, each orifice of the plate being surmounted by a chimney of identical cross section to said orifice, characterized in that the plate is equipped with a plurality of openings arranged on the periphery of each chimney inside a circumscribed circle, the center of which coincides with the center of the chimney, and the radius of which is less than or equal to ⅓ of the shortest distance separating two adjacent chimneys, and in that a single deflector element is arranged beneath each chimney, the openings and the deflector element associated with each of the chimneys being so arranged as to impart a rotating movement to the gas/liquid mixture under each chimney.

2. The distributor tray according to claim 1, characterized in that, beneath each orifice surmounted by a chimney, the deflector element is so arranged as to guide a gas descending through the chimney towards a liquid distributed on the periphery of the chimney through said openings.

3. The distributor tray according to claim 2, characterized in that the surface of the single deflector element, when projected onto the plate, exhibits a contour having a diameter that is greater than that of the chimney, and is possibly equal to that of the circumscribed circle surrounding said openings arranged on the periphery of the chimney with which it is associated and/or characterized in that the single deflector element beneath each chimney exhibits a plane and/or convex form, of which the convexity is directed towards the chimney.

4. The distributor tray according to claim 1, characterized in that the openings are so arranged as to impart a rotating movement to the liquid passing through them or characterized in that the openings are transcurrent orifices, and in that the single deflector element associated with each chimney exhibits a form adapted to impart said rotating movement to the mixture of gas and liquid.

5. The distributor tray according to claim 1, characterized in that the deflector element is so arranged as to guide the liquid emerging from each opening, mixed with the gas emerging from the chimney, in a direction that is inclined at an angle α in relation to the plate of the distributor tray.

6. The distributor tray according to claim 1, characterized in that each deflector element is formed by a plate traversed by a plurality of openings so arranged as to impart a rotating movement to the fluid passing through them or characterized in that each deflection element is formed by a plurality of vanes inclined at the same angle α in relation to the plate of the distributor tray.

7. The distributor tray according to claim 1, characterized in that the openings are distributed at regular intervals on the periphery of each chimney and its axis, said openings.

8. The distributor tray according to claim 6, characterized in that the openings are distributed at regular intervals on the periphery of each chimney and its axis, said openings.

9. The distributor tray according to claim 1, characterized in that each opening comprises a deflection wall, either plane or curved, produced by punching, drilling and/or stamping in order to guide the fluid in a direction that is inclined at an angle α in relation to the plate and substantially tangent to a circle of which the chimney is the center.

10. The distributor tray according to claim 6, characterized in that each opening comprises a deflection wall, either plane or curved, produced by punching, drilling and/or stamping in order to guide the fluid in a direction that is inclined at an angle α in relation to the plate and substantially tangent to a circle of which the chimney is the center.

11. The distributor tray according to claim 1, characterized in that each opening extends along a radius of a circle of which the center lies on the axis of the chimney, and all of the openings associated with one and the same chimney or on one and the same deflector are oriented in one and the same direction in relation to their respective radius.

12. The distributor tray according to claim 6, characterized in that each opening extends along a radius of a circle of which the center lies on the axis of the chimney, and all of the openings associated with one and the same chimney or on one and the same deflector are oriented in one and the same direction in relation to their respective radius.

13. The distributor tray according to claim 1, characterized in that said openings are formed by cutting two sides of a triangle and by folding the triangular part or the deflection wall cut in this way along the third side of the triangle in a direction opposite to the chimney, said folded triangular part or deflection part forming an angle α in relation to the plane of the plate.

14. The distributor tray according to claim 5, characterized in that a is at least 30°.

15. The distributor tray according to claim 13, characterized in that α is at least 30°.

16. The distributor tray according to claim 1, characterized in that it comprises around each chimney a wall forming a barrier that is integral with the plate and extends perpendicular to it, said wall forming a barrier surrounding said openings on the periphery of the chimney and comprising a plurality of holes distributed over its surface for the passage of the liquid, said wall forming a barrier.

17. The distributor tray according to claim 16, characterized in that the holes (51) of said wall forming a barrier (50) are of any shape, in order to assure the passage of at least 20% in volume of the liquid and at most 50% in volume of the liquid, the remainder passing above said wall forming a barrier.

18. The distributor tray according to claim 1, characterized in that the walls of the chimneys are solid and are devoid of orifices or characterized in that each chimney is provided, in its lower part, with orifices for the passage of liquid to the interior of the chimney, these orifices not being able to permit the passage of more than 50% in volume of the total quantity of liquid.

19. A reactor for the treatment of a liquid and a gas circulating as a descending co-current, said reactor comprising at least one distributor tray according to claim 1, each distributor tray being arranged upstream of a catalytic bed in relation to the direction of the liquid/gas flow.

20. Use of the tray according to claim 1 to distribute in a homogeneous manner a liquid and a gas circulating as a descending co-current in a reactor, wherein the gas passes through the tray via the chimneys, and the liquid passes through the tray via the openings in the tray and optionally via orifices of each chimney.

21. The use according to claim 20, wherein gas and a liquid are introduced into the reactor in a gas/liquid volume ratio of less than or equal to 3.

22. The use according to claim 20, wherein the gas contains hydrogen and/or the reactor is a reactor for the hydrogenation of a hydrocarbon charge.

23. The use according to claim 21, wherein the gas contains hydrogen and/or the reactor is a reactor for the hydrogenation of a hydrocarbon charge.

* * * * *